(12) United States Patent
Kim (10) Patent No.: US 9,984,444 B2
(45) Date of Patent: May 29, 2018

(54) APPARATUS FOR CORRECTING IMAGE DISTORTION OF LENS

(71) Applicant: Hyundai Autron Co., Ltd., Seongnam-si (KR)

(72) Inventor: Kee-Beom Kim, Seongnam-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 0 days. days.

(21) Appl. No.: 15/260,560

(22) Filed: Sep. 9, 2016

(65) Prior Publication Data

US 2017/0070650 A1 Mar. 9, 2017

(30) Foreign Application Priority Data

Sep. 9, 2015 (KR) .......................... 10-2015-0127931

(51) Int. Cl.
*H04N 5/217* (2011.01)
*G06T 5/00* (2006.01)
(Continued)

(52) U.S. Cl.
CPC ............ *G06T 5/006* (2013.01); *G06T 3/0018* (2013.01); *H04N 5/3572* (2013.01); *G06T 2207/10024* (2013.01); *H04N 5/23238* (2013.01)

(58) Field of Classification Search
CPC .......... G06T 5/006; G06T 2207/10024; H04N 5/3572; H04N 5/23238
(Continued)

(56) References Cited

U.S. PATENT DOCUMENTS 8,339,483 B2 * 12/2012 Ogasahara ........... H04N 5/2251
348/159
8,885,973 B2 * 11/2014 Rieger .................... G06T 5/006
382/254
(Continued)

FOREIGN PATENT DOCUMENTS

JP H05-110926 A 4/1993
KR 10-2006-0080945 A 7/2000
KR 10-0744937 B1 7/2007

OTHER PUBLICATIONS

Kang et al., "Bilinear Interpolation based Distortion Calibration for wide Angle Lens," The Society for Air-conditioning and Refrigerating Engineers of Korea Academic Conference, 2010, pp. 671-675.

*Primary Examiner* — Ngoc-Yen Vu
(74) *Attorney, Agent, or Firm* — Morgan, Lewis & Bockius LLP (57) ABSTRACT

Disclosed herein is an apparatus for correcting image distortion of a lens, including an input unit for receiving image information, a segmentation unit for segmenting the image information into one or more image subdivision units, a setting unit for setting a center of the image information, a controller for shifting each of the one or more image subdivision units by a variation ratio with respect to the center of the image information, an interpolation unit for inserting one or more image subdivision units corresponding to the shifted image subdivision units into an interpolation space generated between the shifted image subdivision units, and an output unit for outputting corrected image information. According to an embodiment of the present invention, by shifting one or more image subdivision units by a variation ratio, operation logic for coordinate calculation and internal memory logic may be minimized, and implementation complexity may be lowered.

8 Claims, 10 Drawing Sheets

(51) Int. Cl.
*H04N 5/357* (2011.01)
*G06T 3/00* (2006.01)
*H04N 5/225* (2006.01)
*H04N 5/232* (2006.01)

(58) Field of Classification Search
USPC .......................................................... 348/241
See application file for complete search history.

(56) References Cited

U.S. PATENT DOCUMENTS

| | | | |
|---|---|---|---|
| 9,153,014 B2* | 10/2015 | Yu | G06T 5/006 |
| 2006/0140503 A1* | 6/2006 | Kurata | H04N 5/3572 |
| | | | 382/275 |
| 2009/0087115 A1* | 4/2009 | Wong | G06T 5/006 |
| | | | 382/255 |
| 2015/0262344 A1* | 9/2015 | Stec | G06T 5/006 |
| | | | 382/275 |

* cited by examiner

APPARATUS FOR CORRECTING IMAGE DISTORTION OF LENS

CROSS REFERENCE TO RELATED APPLICATION

This application claims the benefit of Korean Patent Application No. 10-2015-0127931, filed on Sep. 9, 2015, entitled "APPARATUS FOR REVISING IMAGE DISTORTION OF LENS", which is hereby incorporated by reference in its entirety into this application.

BACKGROUND

Technical Field

The present invention relates to an apparatus for correcting image distortion of a lens, and more particularly, to an apparatus for correcting image distortion of a lens that shifts images of image subdivision units by a variation ratio.

Description of the Related Art

The technology of correcting image distortion of a lens is directed to correcting image distortion of a lens having a wide angle of view and is widely used in the fields of endoscopes and automobiles.

In particular, in the field of automobiles, the surroundings of a vehicle may be checked through eyes or side view mirrors. For some automobile models, it is easy to check the surroundings of the automobiles through eyes or side view mirrors. For other automobile models, however, it is not easy to check the surroundings of the automobiles through eyes or side view mirrors. In particular, large vehicles have a relatively large number of areas which cannot be checked simply through eyes or side view mirrors, compared to small vehicles.

In this regard, a technology for capturing images of the surroundings of a vehicle using a rear camera mounted to the vehicle or cameras installed at the front, back, left side and right side of the vehicle and outputting an around view image by combining the captured images have been developed. The cameras installed at the front, back, left side, and right side of a vehicle usually employ wide-angle lenses having a wide angle of view and even a fish-eye lens, whose angle of view is greater than 180°. Images captured using lenses having a wide angle of view such as a wide-angle lens and fish-eye lens provide wide views, but a refraction rate increases toward the edges of the images, resulting in severely distorted images. Accordingly, there is a need for a method for correcting distortion of images captured using lenses having a wide angle of view such as a wide-angle lens and fish-eye lens.

Figure 1:
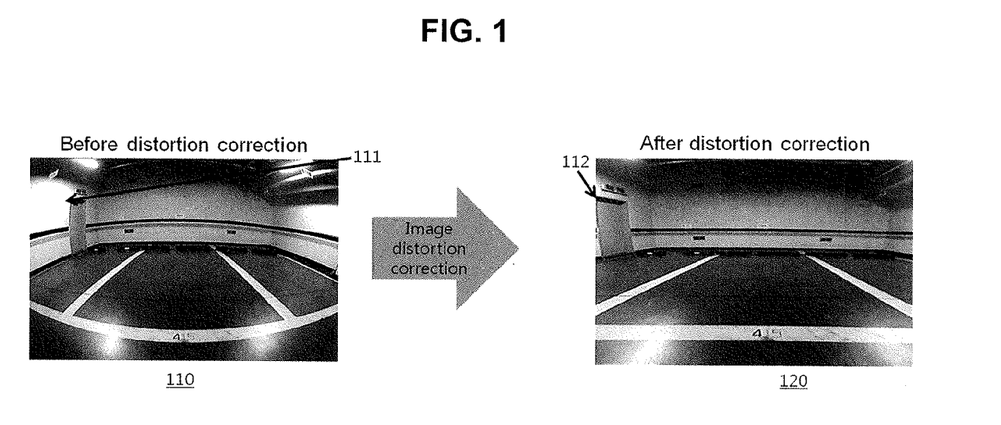
FIG. 1 illustrates a procedure of correcting an image in a conventional apparatus for correcting image distortion of a lens.

FIG. 1 illustrates a procedure of correcting an image in a conventional apparatus for correcting image distortion of a lens.

Referring to FIG. 1, methods for correcting distorted images in a conventional apparatus for correcting image distortion of a lens include distortion correction using a mathematical model and distortion correction using a Cartesian coordinate pattern. When the Cartesian coordinate pattern is used, a distorted image 110 is corrected by shifting each pixel 111.

When the mathematical model is used, coordinates of pixels 121 after correction are obtained by putting the coordinates of each pixel 111 in a predetermined equation, and a corrected image 120 is acquired by arranging the pixels 121. In this case, as the same equation is applied to all pixels, it is difficult to consider the degree of distortion. In addition, since calculation needs to be performed for all pixels, implementation complexity is high and the memory of a large capacity is required.

Figure 2:
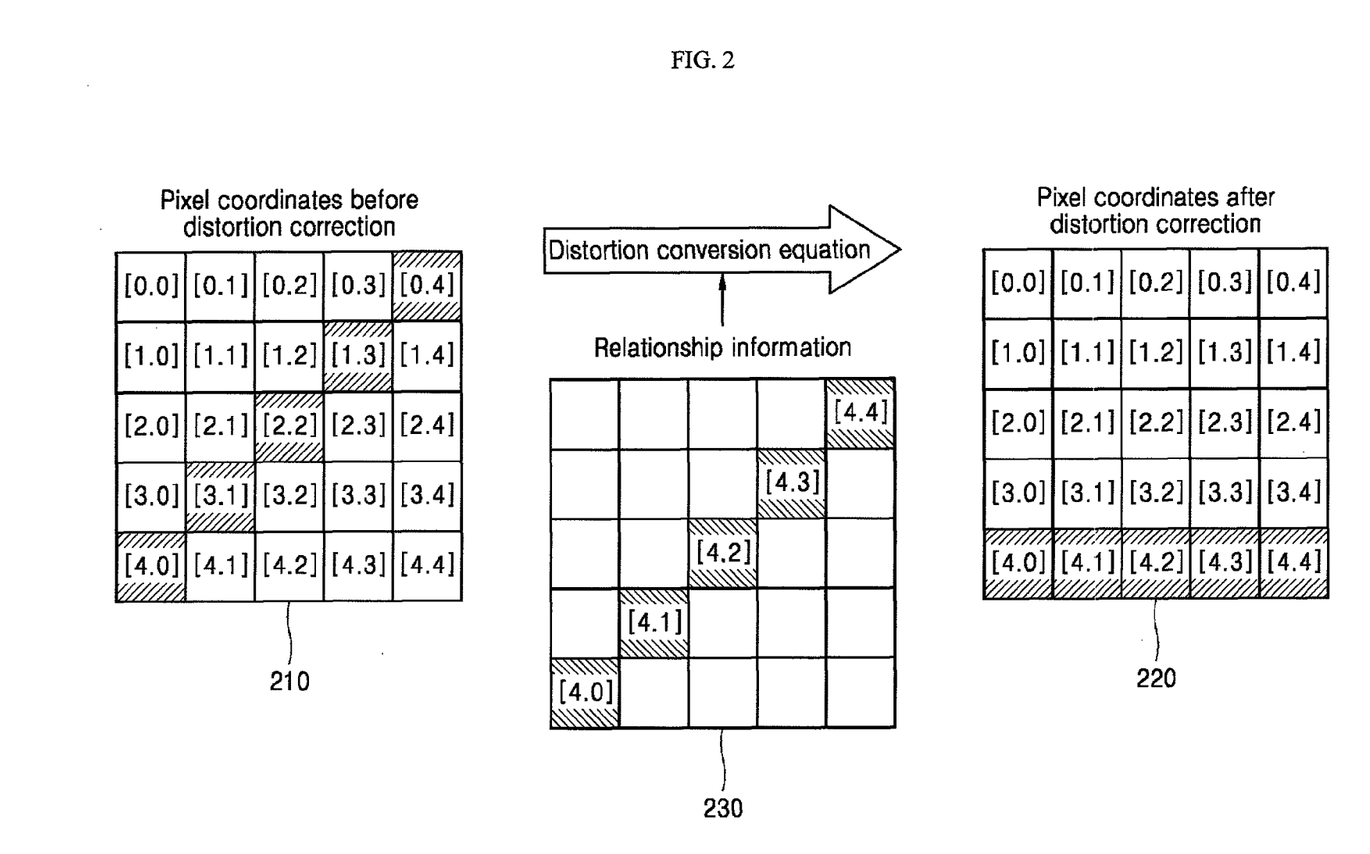
FIG. 2 illustrates a procedure of correcting a distorted image using a conventional Cartesian coordinate pattern.

FIG. 2 illustrates a procedure of correcting a distorted image using a conventional Cartesian coordinate pattern.

Referring to FIG. 2, according to the method for correcting a distorted image using the Cartesian coordinate pattern, relationship information 230 about the relationship between the coordinates of some pixels before distortion correction and the coordinates of some corresponding pixels after correction is acquired. In this case, since the relationship information 230 is acquired using only some pixels, the capability of distortion correction is low. Further, since all pixel values before and after correction need to be stored, a memory having a large capacity is required.

SUMMARY

It is an aspect of the present invention to provide an apparatus for correcting image distortion of a lens which may minimize operation logic and internal memory logic and lower implementation complexity.

It should be noted that objects of the present invention are not limited to the aforementioned object, and other objects of the present invention will be apparent to those skilled in the art from the following descriptions. In addition, it will be appreciated that the objects and advantages of the present invention can be implemented by means recited in the appended claims and the combination thereof.

In accordance with one aspect of the present invention, an apparatus for correcting image distortion of a lens includes an input unit for receiving image information, a segmentation unit for segmenting the image information into one or more image subdivision units, a setting unit for setting a center of the image information, a controller for shifting each of the one or more image subdivision units by a variation ratio with respect to the center of the image information, an interpolation unit for inserting one or more image subdivision units corresponding to the shifted image subdivision units into an interpolation space generated between the shifted image subdivision units, and an output unit for outputting corrected image information.

In accordance with another aspect of the present invention, an apparatus for correcting image distortion of a lens includes an input unit for receiving image information, a setting unit for setting a center of the image information, a segmentation unit for segmenting the image information into predetermined units with respect to the center, a controller for correcting distortion of each of the segmented predetermined units of the image information, and an output unit for outputting corrected image information.

According to an embodiment of the present invention, by shifting one or more image subdivision units by a variation ratio, operation logic for coordinate calculation and internal memory logic may be minimized, and implementation complexity may be lowered.

According to an embodiment of the present invention, by inserting image subdivision units into an interpolation space generated between shifted image subdivision units, high-definition images may be processed.

According to an embodiment of the present invention, the capability of distortion correction may be maximized by changing the variation ratio.

According to an embodiment of the present invention, by moving the center of image information or segmenting the image information into predetermined units, the image information may be corrected according to the degree of distortion.

DETAILED DESCRIPTION

The aforementioned objects, advantages and features of the invention will be set forth in detail with reference to the accompanying drawings such that those skilled in the art can easily practice the present invention. In describing embodiments disclosed in this specification, relevant well-known technologies may not be described in detail in order not to obscure the subject matter of the present invention. Hereinafter, embodiments of the present invention will be described in detail with reference to the accompanying drawings. Like reference numerals are used to refer to the same or like elements throughout the drawings.

Figure 3:
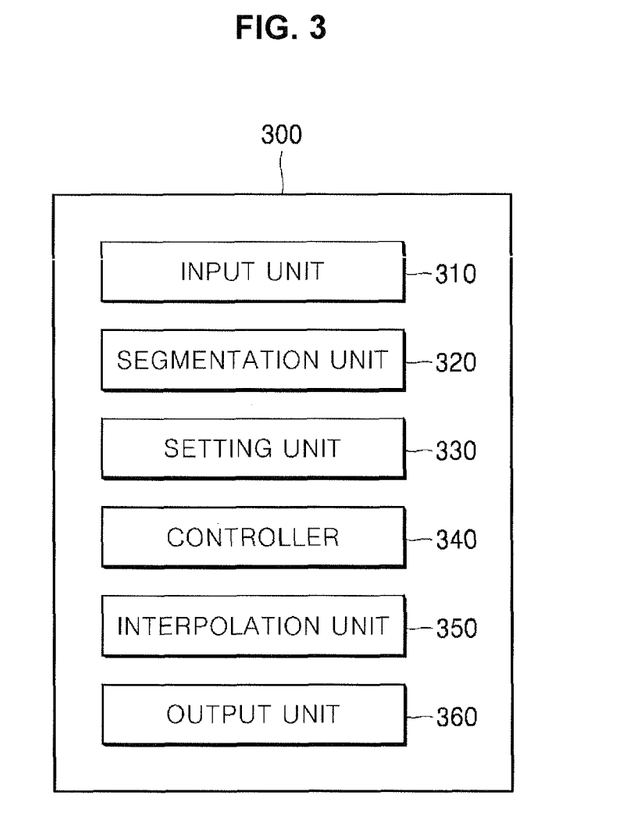
FIG. 3 is a diagram schematically illustrating configuration of an apparatus for correcting image distortion of a lens according to an embodiment of the present invention.

FIG. 3 is a diagram schematically illustrating configuration of an apparatus for correcting image distortion of a lens according to an embodiment of the present invention.

Referring to FIG. 3, an apparatus 300 for correcting image distortion of a lens according to an embodiment of the present invention may include an input unit 310, a segmentation unit 320, a setting unit 330, a controller 340, an interpolation unit 350, and an output unit 360.

The apparatus 300 for correcting image distortion shown in FIG. 3 is simply an embodiment, and elements thereof are not limited to the embodiment shown in FIG. 3. When necessary, some elements may be added, changed or omitted.

Figure 4A:
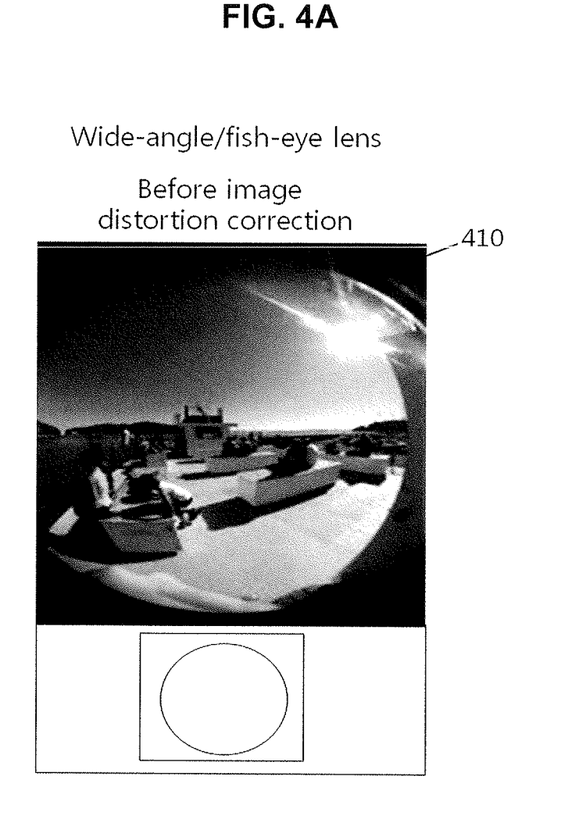
FIG. 4A, FIG. 4B and FIG. 4C illustrate a procedure of correcting a distorted image in an apparatus for correcting image distortion of a lens according to an embodiment of the present invention.
Figure 4B:
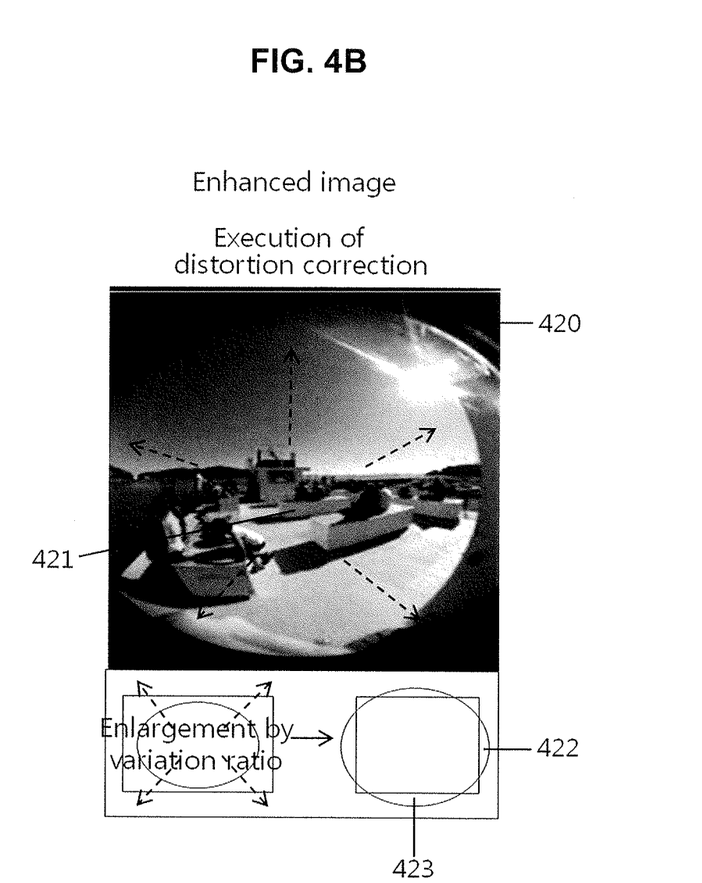
Figure 4C:
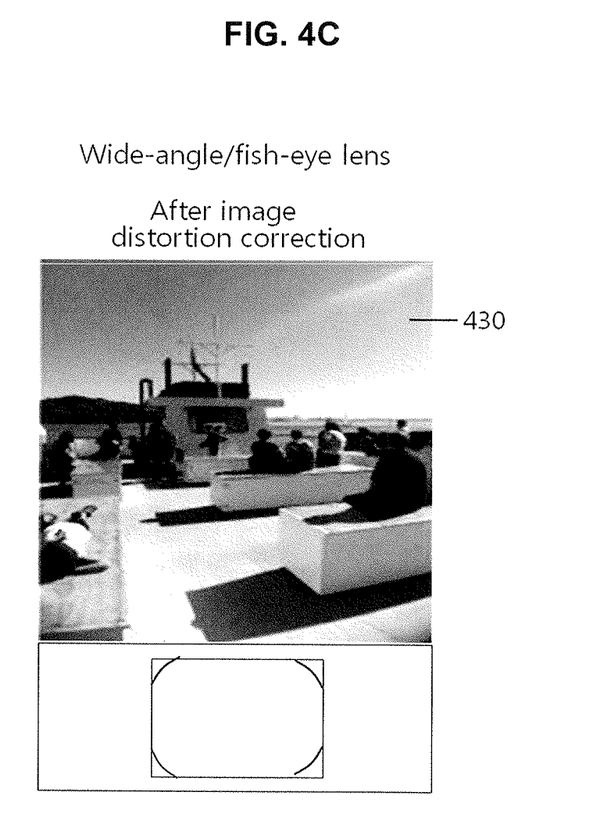
Figure 5:
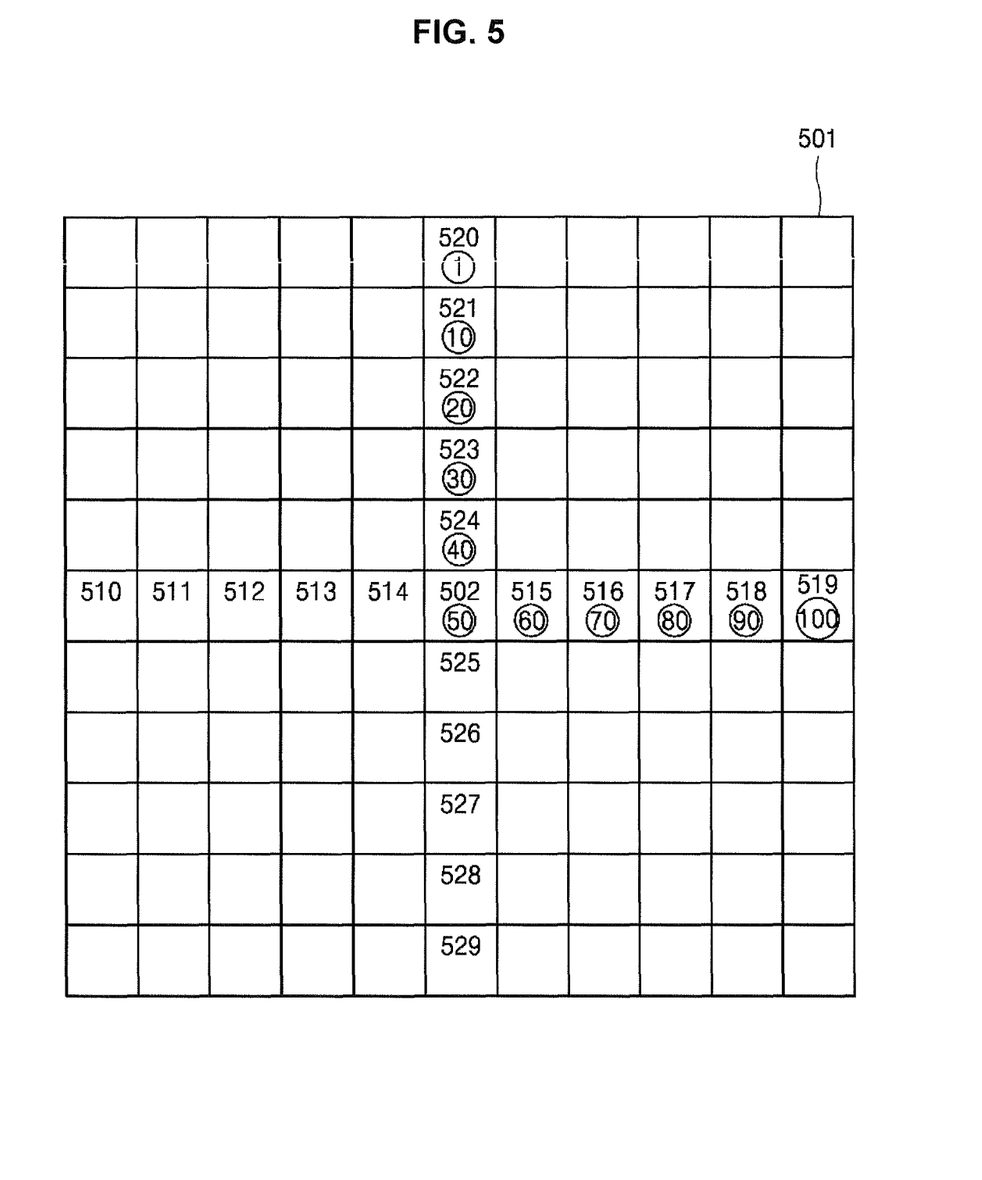
FIG. 5 schematically illustrates image subdivision units and the center of image information given before distortion correction.

FIGS. 4A, 4B and 4C illustrate a procedure of correcting a distorted image in the apparatus 300 for correcting image distortion of a lens according to an embodiment of the present invention, and FIG. 5 schematically illustrates image subdivision units 510 to 519 and 520 to 529 and the center 502 of image information 501 given before distortion correction.

Figure 6:
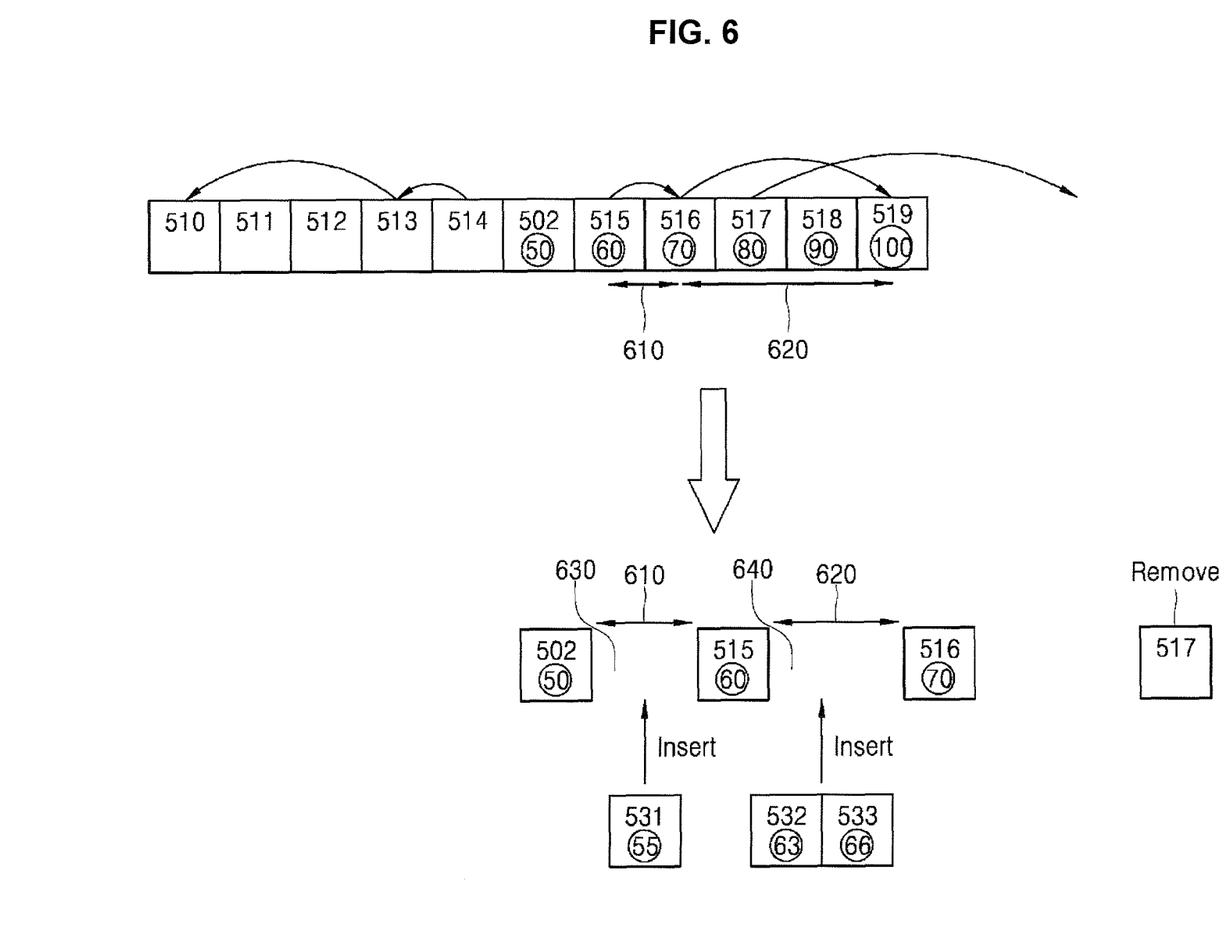
FIG. 6 illustrates a procedure of inserting image subdivision units into horizontally shifted image subdivision units.
Figure 7:
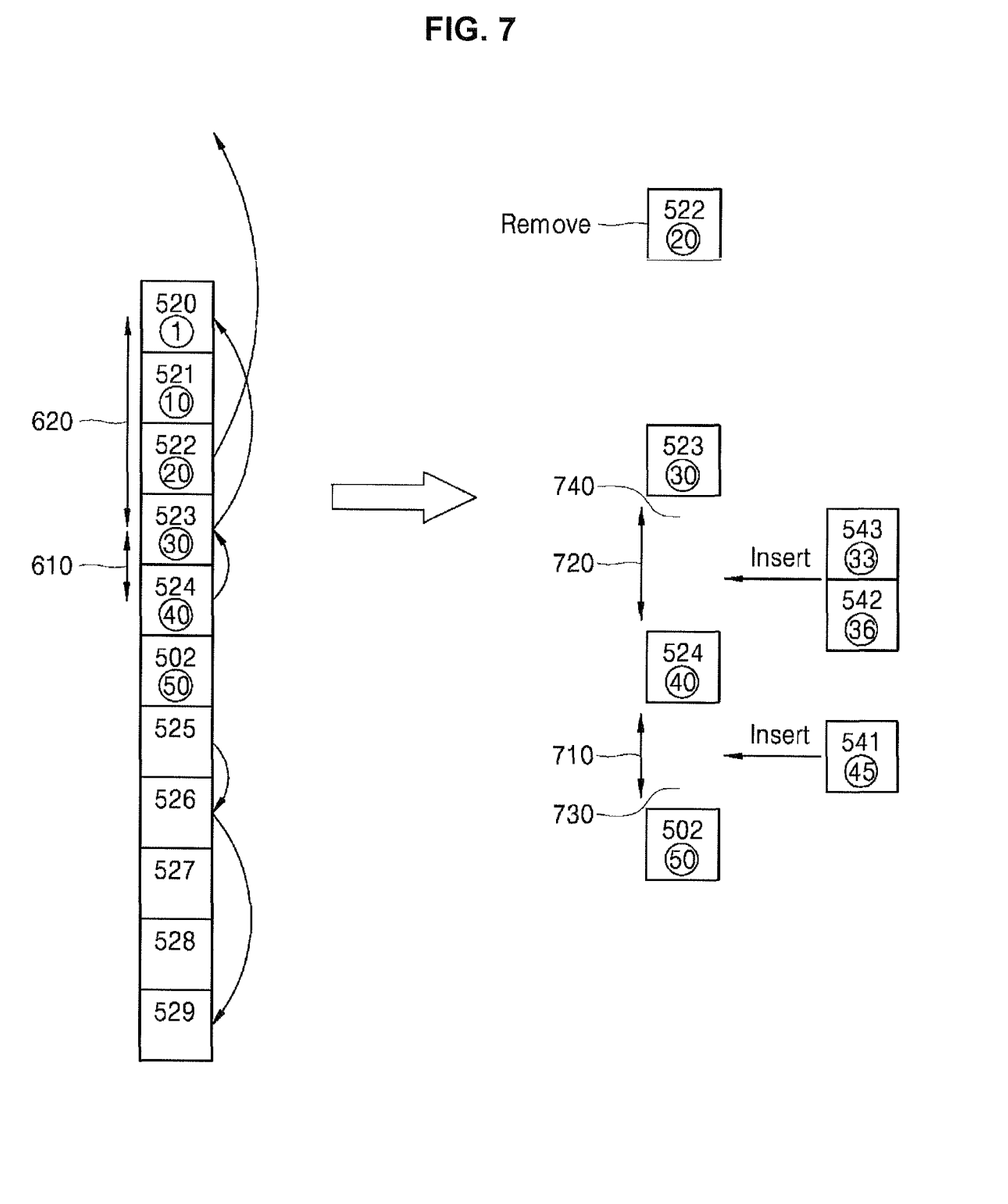
FIG. 7 illustrates a procedure of inserting image subdivision units into vertically shifted image subdivision units.

FIG. 6 illustrates a procedure of inserting image subdivision units into horizontally shifted image subdivision units, and FIG. 7 illustrates a procedure of inserting image subdivision units into vertically shifted image subdivision units.

Hereinafter, the apparatus 300 for correcting image distortion of a lens according to an embodiment of the present invention will be described with reference to FIGS. 3 to 7.

The input unit 310 may generate or receive image information (410 of FIG. 4A, 501 of FIG. 5). The input unit 310 may be a device or mechanism such as a camera or CCTV which is capable of capturing images, but embodiments of the present invention are not limited thereto. The image information 410, 501 is information captured by the input unit 310. For example, the image information 410, 501 may be a photograph or a moving image.

The segmentation unit 320 may segment the image information 501 (see FIG. 5) into one or more image subdivision units 510 to 519 and 520 to 529 (see FIG. 5). The image subdivision units 510 to 519 and 520 to 529 are units for dividing the image information 501 into parts having a certain size. For example, the image subdivision units 510 to 519 and 520 to 529 may be pixels. Dividing the image information 501 into one or more image subdivision units 510 to 519 and 520 to 529 is intended to individually shift the image subdivision units 510 to 519 and 520 to 529.

The setting unit 330 may set the center (421 of FIG. 4B, 502 of FIG. 5) of the image information (420 of FIG. 4B, 501 of FIG. 5). The setting unit 330 may set the center to the image subdivision unit 502, which is the center of both horizontal and vertical arrangements.

Alternatively, the setting unit 330 may set the center to an image subdivision unit in the most severely distorted portion of the image information.

The setting unit 330 may set the center to a boundary between image subdivision units, but embodiments of the present invention are not limited thereto.

The controller 340 may shift one or more image subdivision units 510 to 519 and 520 to 529 by variation ratios 610, 620, 710 and 720 with respect to the image subdivision unit 502 of the image information 501.

In one embodiment, the controller 340 may horizontally or vertically shift the image subdivision units 510 to 519 and 520 to 529. The controller 340 may diagonally shift the image subdivision units. The directions in which the controller 340 shifts the image subdivision units are not limited to the horizontal direction, vertical direction and diagonal direction.

A pixel value may represent the color of each of the image subdivision units 510 to 519 and 520 to 529. For example, the pixel value may be an RGB value, YCbCr value, HSB value or CMY value. For example, in FIG. 5, the pixel values of the image subdivision units 502 and 515 may be 50 and 60. The variation ratios 610, 620, 710 and 720 may be distances between the shifted image subdivision units.

The variation ratios 610, 620, 710 and 720 may be differently set for the respective image subdivision units 510 to 519 and 520 to 529.

For example, as shown in FIGS. 6 and 7, the variation ratios 610, 620, 710 and 720 may increase as the distance from the image subdivision unit 502 of the image information 501 increases. That is, a higher variation ratio may be applied to an image subdivision unit which is spaced farther from the image subdivision unit 502 of the image information 501.

Alternatively, although not shown in the figures, the variation ratio may decrease as the distance from the image subdivision unit 502 of the image information 501 increases. That is, a lower variation ratio may be applied to an image subdivision unit which is spaced farther from the image subdivision unit 502 of the image information 501.

Alternatively, the same variation ratio may be applied to the image subdivision units disposed in a partial region of the image information 501.

Alternatively, the variation ratio may be designated by the user.

Interpolation spaces 630, 640, 730 and 740 are generated between the shifted image subdivision units, and the interpolation unit 350 may insert one or more image subdivision units corresponding to the shifted image subdivision units in the interpolation spaces 630, 640, 730 and 740.

Referring to FIGS. 4 to 6, the controller 340 horizontally shifts the image subdivision units 510 to 519, and the interpolation unit 350 inserts image subdivision units 531, 532 and 533 into the shifted image subdivision units 515, 516 and 517. Hereinafter, this procedure will be described in detail.

First, the controller 340 shifts the image subdivision unit 515 to the position of the image subdivision unit 516 with respect to the image subdivision unit 502. The image subdivision unit 516 is shifted to the position of the image subdivision unit 519. In this way, the image subdivision units 510 to 519 are shifted. According to the embodiment illustrated in FIG. 6, as the distance between the center 502 and the image subdivision units 510 to 519 increases, the variation ratio 610, 620 by which the image subdivision units 510 to 519 are shifted increases.

In contrast with the embodiment of FIG. 6, the controller 340 may shift the image subdivision units 510 to 519 by the same variation ratio. Alternatively, as the distance between the center and the image subdivision units 510 to 519 increases, the variation ratio by which the image subdivision units 510 to 519 are shifted may decrease.

The controller 340 may shift the image subdivision unit 515 to a position between the image subdivision unit 515 and the image subdivision unit 516. In this case, the image subdivision unit 515 may be regenerated at the position of the image subdivision unit 516.

When the image subdivision units 515, 516 and 517 are shifted, the interpolation spaces 630 and 640 are generated. The interpolation spaces 630 and 640 refer to spaces where no image subdivision unit is present after the image subdivision units are shifted.

In FIG. 6, the empty spaces generated according to shift of the image subdivision units 515, 516 and 517 are the interpolation spaces 630 and 640. The interpolation unit 350 inserts the image subdivision units 531, 532 and 533 into the interpolation spaces 630 and 640.

In FIG. 6, the interpolation unit 350 may insert an image subdivision unit 531 having 55 as a pixel value into the interpolation space 630 and the image subdivision units 532 and 533 having 63 and 66 as pixel values into the interpolation space 640. The inserted image subdivision units 531, 532 and 533 have pixel values corresponding to the shifted image subdivision units 515, 516 and 517. For example, in FIG. 6, the pixel values of the image subdivision units 532 and 533 may be within the pixel values of the image subdivision unit 515 and image subdivision unit 516. By inserting image subdivision units having pixel values corresponding to the pixel values of the shifted the image subdivision units, high-definition image information may be corrected, and image quality may be improved.

Meanwhile, the controller 340 may remove image subdivision units which cannot be shifted to the positions of other image subdivision units. In FIG. 4B, the controller may remove the image subdivision units in the areas 422 and 423.

In FIG. 6, since the image subdivision unit 517 cannot be shifted to the position of another image subdivision unit, the controller 340 may remove the image subdivision unit 517.

Referring to FIGS. 4 to 7, the controller 340 vertically shifts the image subdivision units 520 to 529, and the interpolation unit 350 inserts image subdivision units 541, 542 and 543 into the spaces between the shifted image subdivision units 515, 516 and 517. Hereinafter, this procedure will be described in detail.

First, the controller 340 shifts the image subdivision unit 524 to the position of the image subdivision unit 523 with respect to the image subdivision unit 502. The image subdivision unit 523 is shifted to the position of the image subdivision unit 520. In this way, the image subdivision units 520 to 529 are shifted. According to the embodiment illustrated in FIG. 7, as the distance from the center 502 increases, the variation ratio 710, 720 increases. In contrast with the embodiment of FIG. 7, the controller 340 may shift the image subdivision units 520 to 529 by the same variation ratio. Alternatively, as the distance from the center increases, the variation ratio by which the image subdivision units 520 to 529 are shifted may decrease.

The controller 340 may shift the image subdivision unit 524 to a position between the image subdivision unit 524 and the image subdivision unit 523. In this case, the image subdivision unit 524 may be regenerated at the position of the image subdivision unit 523.

When the image subdivision units 522, 523 and 524 are shifted, interpolation spaces 730 and 740 are generated. In FIG. 7, the empty spaces generated according to shift of the image subdivision units 522, 523 and 524 are the interpolation spaces 730 and 740. The interpolation unit 350 inserts the image subdivision units 541, 542 and 543 into the interpolation spaces 730 and 740.

In FIG. 7, the interpolation unit 350 may insert an image subdivision unit 541 having 45 as a pixel value into the interpolation space 730 and the image subdivision units 543 and 542 having 33 and 36 as pixel values into the interpolation space 740. The inserted image subdivision units 541, 542 and 543 have pixel values corresponding to the shifted image subdivision units 522, 523 and 524. For example, in FIG. 7, the pixel values of the image subdivision units 542 and 543 may be within the pixel values of the image subdivision unit 523 and 524. By inserting image subdivision units having pixel values corresponding to the pixel values of the shifted the image subdivision units, high-definition image information may be corrected, and image quality may be improved.

Meanwhile, the controller 340 may remove image subdivision units which cannot be shifted to the positions of other image subdivision units. In FIG. 4B, the controller may remove the image subdivision units in the areas 422 and 423. In FIG. 7, since the image subdivision units 522 cannot be shifted to the position of another image subdivision unit, the controller 340 may remove the image subdivision units 522.

The output unit 360 may output corrected image information. The output unit 360 is a device capable of outputting image information. For example, the output unit 360 may be a display, a monitor, or a TV. Referring to FIG. 4C, the output unit may output the image information 430 after correction.

Figure 8:
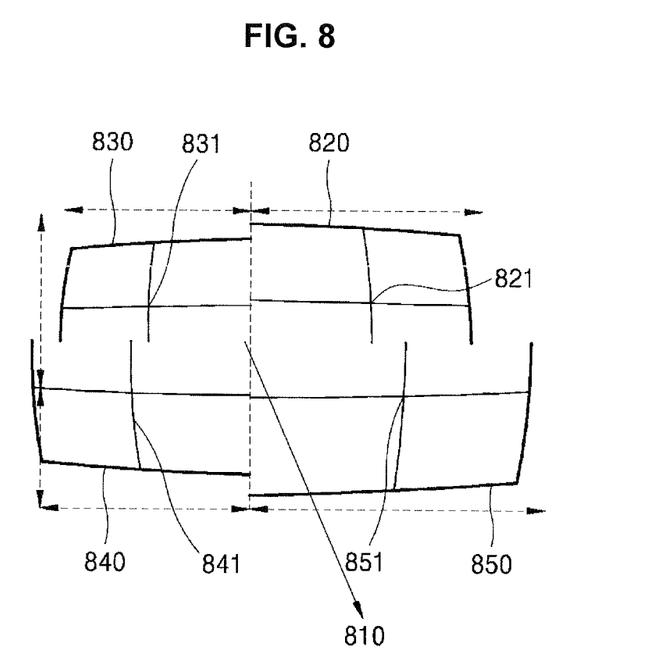
FIG. 8 illustrates a procedure of correcting a distorted image in an apparatus for correcting image distortion of a lens according to another embodiment of the present invention.

FIG. 8 illustrates a procedure of correcting a distorted image in an apparatus for correcting image distortion of a lens according to another embodiment of the present invention. Hereinafter, a description will be given of an apparatus for correcting image distortion of a lens according to another embodiment of the present invention, with reference to FIG. 8.

According to another embodiment, an apparatus for correcting image distortion of a lens may include an input unit, a setting unit, a segmentation unit, a controller, and output unit, and an interpolation unit. The input unit, output unit and interpolation unit of the apparatus for correcting image distortion according to this embodiment have the same configurations, functions and effects as the input unit, output unit and interpolation unit described in FIGS. 3 to 7, and thus a description thereof is omitted.

The setting unit may set the center 810 of image information, and the segmentation unit may segment the image information into predetermined units based on the center 810. The method used by the setting unit to set the center 810 of the image information is the same as the method described in FIGS. 3 to 7, and thus a description thereof is omitted.

The predetermined units may be quadrisections arranged in the horizontal and vertical directions with respect to the center 810 of the image information. However, this is simply an example, and the predetermined units may be designated differently from the quadrisections by the user.

In order to correct the image information according to the degree of distortion, the segmentation unit segments the image information into predetermined units, thereby obtaining image information segments 820, 830, 840 and 850. That is, the image information is corrected by dividing the image information segments 820, 830, 840 and 850 into a part which is subjected to severe distortion and a part which is not subjected to severe distortion. Thereby, correction efficiency may be denounced.

According to an embodiment, the setting unit may set centers 821, 831, 841 and 851 of the image information segments 820, 830, 840 and 850 divided into predetermined units. The segmentation unit may segment each of the image information segments 820, 830, 840 and 850 into one or more image subdivision units.

The method used by the setting unit to set the centers 821, 831, 841 and 851 of the image information segments 820, 830, 840 and 850 is the same as the method illustrated in FIGS. 3 to 7, and thus a description thereof is omitted. The method used by the segmentation unit to segment the image information segments 820, 830, 840 and 850 is the same as the method illustrated in FIGS. 3 to 7, and thus a description thereof is also omitted.

The controller may correct distortion of each of the image information segments 820, 830, 840 and 850 divided into predetermined units. In one embodiment, the controller may shift one or more image subdivision units of each of the image information segments 820, 830, 840 and 850 by a corresponding variation ratio with respect to the centers 821, 831, 841 and 851. The method used by the controller to shift the image subdivision units of each of the image information segments 820, 830, 840 and 850 by a corresponding variation ratio with respect to the centers 821, 831, 841 and 851 is the same as the method illustrated in FIGS. 3 to 7, and thus a description thereof is omitted.

According to another embodiment of the present invention illustrated in FIG. 8, the setting unit may set the centers 821, 831, 841 and 851 of the image information segments 820, 830, 840 and 850 to the center 810. If the centers 821, 831, 841 and 851 of the predetermined units 820, 830, 840 and 850 are set to the center 810 of the image information, the predetermined units may be quadrisected in the horizontal and vertical directions to correct distortion. In addition, if the centers 821, 831, 841 and 851 of the predetermined units 820, 830, 840 and 850 are set to the center 810 of the image information, the image information may be quadrisected in the horizontal and vertical directions, and distortion of each of the quadrisections may be corrected.

Those skilled in the art will appreciate that various substitutions, modifications, variations can be made to the present invention without departing from the technical spirit of the invention and that the present invention is not limited to the embodiments described above and the accompanying drawings.

What is claimed is:

1. An apparatus for correcting image distortion of a lens, comprising:
   an input device configured for receiving image information;
   a segmentation device configured for segmenting the image information into one or more image subdivision units;
   a setting device configured for setting a center of the image information;
   a controller for shifting each of the one or more image subdivision units by a variation ratio with respect to the center of the image information;
   an interpolation device configured for inserting one or more image subdivision units corresponding to the shifted image subdivision units into an interpolation space generated between the shifted image subdivision units; and
   an output device configured for outputting corrected image information.

2. The apparatus according to claim 1, wherein the variation ratio is set to increase as a distance from the center of the image information increases.

3. The apparatus according to claim 1, wherein the controller horizontally or vertically shifts the one or more image subdivision units.

4. An apparatus for correcting image distortion of a lens, comprising:
   an input device configured for receiving image information;
   a setting device configured for setting a center of the image information;
   a segmentation device configured for segmenting the image information into predetermined units with respect to the center;
   a controller for correcting distortion of each of the segmented predetermined units of the image information; and
   an output device configured for outputting corrected image information,
   wherein the setting device sets a center of each of the segmented predetermined units of the image information, and
   wherein the controller shifts one or more image subdivision units contained in each of the segmented predetermined units of the image information by a variation ratio with respect to the center of each of the segmented predetermined units.

5. The apparatus according to claim 4, wherein the segmentation device segments each of the segmented predetermined units of the image information into one or more image subdivision units.

6. The apparatus according to claim 4, further comprising:
   an interpolation device configured for inserting one or more image subdivision units corresponding to the shifted image subdivision units into an interpolation space generated between the shifted image subdivision units.

7. The apparatus according to claim 4, wherein the variation ratio is set to increase as a distance from the center of each of the segmented predetermined units of the image information increases.

8. The apparatus according to claim 4, wherein the controller horizontally or vertically shifts the one or more image subdivision units.

\* \* \* \* \*